This invention relates to a coupling for joining a pair of pipe ends which will allow for expansion, contraction and deflection of one pipe end with respect to the other.

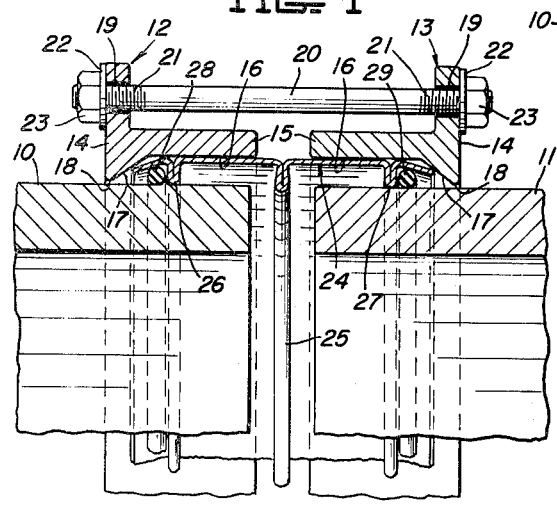
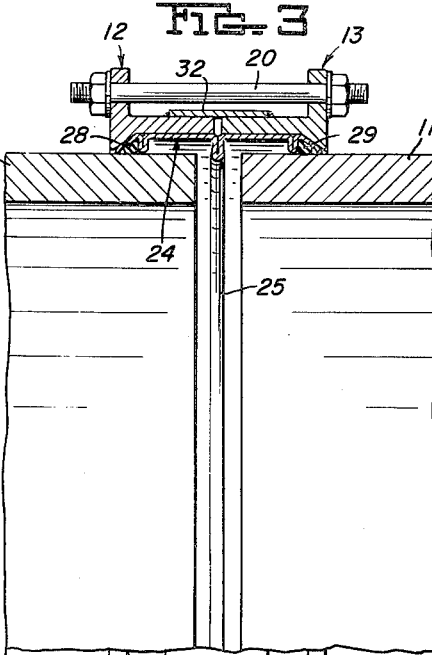
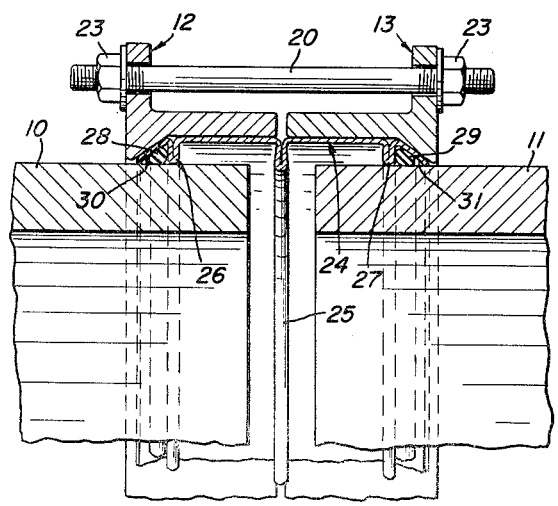
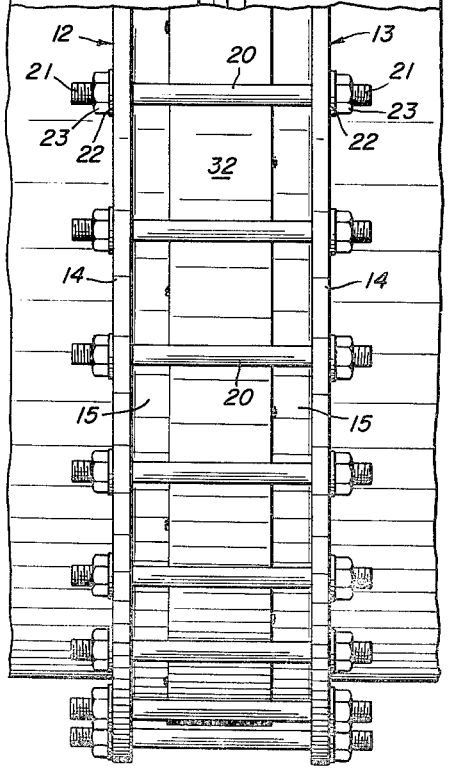
INVENTOR
BORIS PHILLIPS
By Donald G. Dalton
Attorney 3,235,292
PIPE COUPLING
Boris Phillips, Los Angeles, Calif., assignor to United States Steel Corporation, a corporation of New Jersey
Filed June 3, 1963, Ser. No. 284,914
1 Claim. (Cl. 285—231)

One object of the invention is to provide a pipe coupling comprising opposed clamping rings surrounding a pair of pipe ends, an inner ring within the clamping rings and adapted to be deformed thereby around packing means, the deformed inner ring opposing fluid-pressure extrusion of this packing means between the inner ring and the pipe ends, thereby sealing the joint.

A further object is to provide a pipe coupling comprising a pair of opposed clamping rings, each ring having a frusto-conical inner face, an inner ring surrounding the pipe ends within the clamping rings and having an inwardly extending rib spaced from each end thereof, a packing ring on the outer face of each rib and means to draw the clamping rings toward each other to effect engagement of the frusto-conical faces with the ends of the inner ring, thereby confining the packing rings between the ribs and the ends of the inner ring when deformed inwardly by such engagement.

In accomplishing these and other objects of the invention, I have provided improved details of structure, a preferred form of which is shown in the accompanying drawings.

In the drawings:

FIGURE 1 is a longitudinal section of a portion of two pipe ends showing the invention as initially assembled;

FIGURE 2 is a section similar to FIGURE 1, showing the coupling as finally assembled; and FIGURE 3 is a section somewhat similar to FIGURE 2 showing one half of a joint of invention, the other half being in elevation and showing a circumferential band welded on the joint.

Turning now to the drawing, pipe ends 10, 11 may be the ends of two lengths of pipe of relatively large diameter and wall thickness to be joined together in a pipe line to carry liquids or gases. Surrounding the pipe ends are opposed clamping rings 12, 13, each of which preferably comprises an outer flange portion, 14, disposed in a plane generally perpendicular to the axis of the ring and to an integral inner cylindrical portion 15. The spacing of the flange and cylindrical portion relative to each other is such that adjacent the pipe end, the cylindrical inner surface 16 of portion 15 merges with an outwardly converging frusto-conical surface 17 on flange portion 14 that in turn merges with the perpendicular outer face of the flange portion in a chamfer 18, spaced to provide a small clearance with the pipe. It will be understood that, in making large diameter couplings, it is necessary to have a clearance between these adjacent parts, sufficient to accommodate pipe diameter variations, expansion, contraction and deflections of one pipe end with respect to the other.

Each flange portion 14 is provided with a plurality of holes 19 distributed around the ring at suitable intervals according to the size of the coupling and the pressure to be sustained in the pipe line. Studs 20 pass through corresponding holes 19 in clamping rings 12, 13 respectively. The studs have threaded ends 21 to accommodate washers 22 and nuts 23 that may be advanced toward each other to draw together the opposed clamping rings.

Surrounding the pipe ends and spaced within the clamping rings is an inner ring ar sleeve 24, which may be fabricated of stainless steel, mild steel or other material suitable in thickness and corrosion resistance for the intended service. Each ring preferably has an inwardly extending rib 25 substantially equally spaced from the ends thereof, to serve as a stop for centering ring 24 over the joint. The ring 24 is made wide enough to cover the gap between the pipe ends which would vary according to the design specification for each joint. Ring 24 has inwardly extending ribs 26, 27, spaced from each end thereof and making contact with the periphery of each pipe end. The ribs may be rings welded to inner ring 24 or as shown in the drawings, may be fabricated by crimping the ring. Packing rings 28, 29, e.g., rubber O-rings, are placed on each pipe end between the ribs 26, 27 and the respective frusto-conical surfaces 17. Ribs 26, 27 serve as retainers for rings 28, 29.

As shown in FIGURE 2, the ends 30, 31 of ring 24 are spaced from the ribs 26, 27, respectively, preferably to make contact with the periphery of each pipe end, when the clamping rings are drawn together to effect engagement of the ends 30, 31 with the frusto-conical faces 17. When the ends 30, 31 are deformed inwardly by this engagement, they compress rings 28, 29 against the pipe and confine them between the ends and ribs of ring 24 in an enclosure that will keep the rings 28, 29 in predetermined position and serve to protect them from exposure to the atmosphere.

In the assembling and applying the coupling, a pair of pipe ends to be joined have applied to each of them a clamping ring and a packing ring. The inner ring 24 is mounted on one pipe end, so as to space the end thereof the preferred distance from center rib 25. The other pipe end is approximately aligned with the first and then inserted in the other end of ring 24 and brought into similar juxtaposition with center rib 25. Studs 20 are then inserted in the respective holes 19 of flanges 14. After mounting washers 22 and nuts 23 on the threaded ends 21 of the studs, the nuts are turned to draw the clamping rings together. As the clamping rings are drawn together, there is engagement of each frusto-conical face 17 with the respective ring ends 30, 31. As a result, there is gradual inward deformation of the ring ends until they meet the pipe ends. This deformation also compresses the packing rings 28, 29 against the pipe ends.

Outward extrusion of the deformed packing rings is precluded because of the close fit of the ring ends 30, 31 with the pipe, despite the clearance between the clamping rings and the pipe ends. This provides a leak-proof, flexible joint that is self-sealing in service, since the packing rings become more firmly wedged in the direction of applied fluid pressure. The recited engagement confines the packing rings in the enclosure between ribs 26, 27 and ring ends 30, 31. Final assembly of the joint may be easily verified by observing at the clearance between clamping rings and pipe that ring ends 30, 31 are substantially completely deformed onto the pipe ends and that rib 25 is centered between the clamping rings.

When the pipe line is installed in surroundings that may corrode the stud threads, for example, it is preferred to join the pipe ends permanently. To this end, I apply a circumferential band 32 around the outside of the coupling and weld the edges thereof to the cylindrical portions 15 of the respective clamping rings. This may be done after final assembly of a joint, the studs being then removed.

While the drawings and the above description illustrate a preferred coupling structure, changes may be made therein without departing from the spirit of the invention. Packing rings 28, 29 may be triangular, rather than circular, in cross section to provide an initial wedge shape and to improve the sealing effect between the pipe and inner ring ends that opposes the pressure of the fluid to extrude the packing therebetween. In the initial assembly of the joint, ribs 26, 27 need not make contact with the pipe. The described engagement of the frusto-conical faces 17 can provide this engagement and even deform ribs 26, 27 into tighter engagement with the pipe, for example, by slightly shortening the length of ring ends 30, 31. In the initial assembly, circumferential band 32 may be welded to one clamping ring, the other edge of the band being welded to the other clamping ring after final assembly of the coupling. For proper centering of the coupling in the pipe ends, the outside of band 32 may be marked and observed in assembling the joint, rather than center rib 25.

The invention is characterized by several distinct advantages. In the first place, the coupling produces a long lasting, flexible, leak-proof joint, having a minimum number of parts that may be easily assembled in the field construction of large-diameter pipe lines. Proper final assembly of a joint may be observed at the clearances between the clamping rings and between these rings and the respective pipe ends.

Secondly, the inner ring is not a structural member, but a sealing membrane, since the fluid pressure is transferred from this ring to the clamping rings. Hence, the inner ring may be a light, flexible shell, fabricated from a more expensive corrosion-resistant material, such as stainless steel, without prohibitive cost.

Thirdly, the clamping rings or, more particularly, the frusto-conical inner faces thereof, engage and deform the inner ring to confine the packing rings between the ring and a pipe end. This engagement also deforms the packing rings to create preloaded conditions caused by restoration forces of the rings' cross sections. Hence, the studs do not carry this initial deformation load, but only the load due to fluid pressure. Furthermore, sealing of the joint is effected as this fluid pressure acts to extrude the packing rings between the pipe and the inner ring which is held rigidly in place by the clamping rings.

Although I have disclosed herein the preferred structure and assembly of my invention, I intend to cover as well any change or modification therein which may be made without departing from the spirit and scope of the invention.

I claim:

A coupling for a pair of pipe ends in approximate axial alignment comprising a sleeve larger in inside diameter than the outside diameter of said pipe ends, said sleeve having a rib extending radially inward adjacent each outer end thereof but spaced inwardly thereof, the inside diameter of said ribs being sufficient to receive said pipe ends and proportioned with respect to said pipe ends to prevent extrusion of a gasket therebetween, the outer end portions of said sleeve outwardly of said ribs initially tapering from said ribs to a diameter intermediate the inside diameter of the sleeve and the outside diameter of said pipe ends to form with said ribs a gasket receiving recess, an elastomeric seal ring in said recess and in contact with each of its respective said ribs and the adjacent outer end portion of the sleeve, a clamping ring fitting over each outer end portion of the sleeve and means for drawing said rings toward each other, each ring having its interior tapered on the outer end portion thereof at a greater angle than the taper of said sleeve outer ends whereby to engage and bend inwardly said outer end portions of said sleeves, increasing the taper thereof and compressing said gasket against said rib, said sleeve tapered end and said pipe by reducing the volume of said recess, when the rings are drawn toward each other.

References Cited by the Examiner
UNITED STATES PATENTS

| 406,035 | 7/1889 | Dresser | 285—383 X |
| 811,632 | 2/1906 | Graham | 285—383 X |
| 915,956 | 3/1909 | Hazlet | 285—231 |
| 1,753,386 | 4/1930 | Paltrowitz | 285—383 X |
| 1,955,831 | 4/1934 | Raybould | 285—372 X |
| 2,288,904 | 7/1942 | Hudson | 285—337 X |
| 2,901,274 | 8/1959 | Smith | 285—369 X |
| 2,980,449 | 4/1961 | Dunton | 285—369 X |

FOREIGN PATENTS

| 814,689 | 9/1951 | Germany. |

CARL W. TOMLIN, *Primary Examiner.*